United States Patent [19]

Vermeiren et al.

[11] Patent Number: 4,836,334
[45] Date of Patent: Jun. 6, 1989

[54] LUBRICATING DEVICE

[75] Inventors: Karel N. Vermeiren Woerden, Hendrik Dolfsma, Tull RN t' Waal, Netherlands

[73] Assignee: SKF Industrial Trading and Development Co., B.V., Netherlands

[21] Appl. No.: 56,043

[22] Filed: Jun. 1, 1987

[30] Foreign Application Priority Data

Jun. 25, 1986 [NL] Netherlands ............... 8601665

[51] Int. Cl.⁴ .................................... F16N 11/04
[52] U.S. Cl. ............................. 184/45.1; 184/67; 384/399; 384/448; 384/471; 384/473
[58] Field of Search ..................... 184/65-67, 184/73-75, 79, 6.4, 7.4, 108, 45.1, 45.2, 46, 6.3; 310/90, 153, 156, 168; 222/387; 384/398, 399, 448, 471, 473

[56] References Cited

U.S. PATENT DOCUMENTS

| 912,740 | 2/1909 | Schrode | 184/67 |
|---|---|---|---|
| 1,202,895 | 10/1916 | Rogers | 184/67 |
| 1,664,613 | 4/1928 | French | 184/67 |
| 1,870,416 | 8/1932 | Lovell | 184/67 |
| 2,096,808 | 10/1937 | Jenkins | 184/67 |
| 2,302,423 | 11/1942 | Davis | 184/67 |
| 2,837,174 | 6/1958 | Lyden | 184/67 |
| 3,430,731 | 3/1969 | Satzinger | 184/39 |
| 3,553,511 | 1/1971 | Hemmings | 310/156 |
| 4,477,745 | 10/1984 | Lux | 310/156 |

FOREIGN PATENT DOCUMENTS 9932 of 1890 United Kingdom ............ 184/67

Primary Examiner—Leonard E. Smith
Attorney, Agent, or Firm—Eugene E. Renz Jr.

[57] ABSTRACT

A device for supplying a lubricant to a mechanism, in particular a rolling bearing, comprising a container for holding a quantity of lubricant which at its lower edge is provided with a discharge channel for the lubricant and wherein a spring-loaded piston-like element is located in such fashion that the force of the spring presses this element in the direction of the discharge channel, characterized in that in the discharge channel is mounted a valve member, normally found in the closed position, which is coupled with an electric circuit which upon excitation controls the valve member bringing this valve member into the open and again into the closed position.

1 Claim, 1 Drawing Sheet

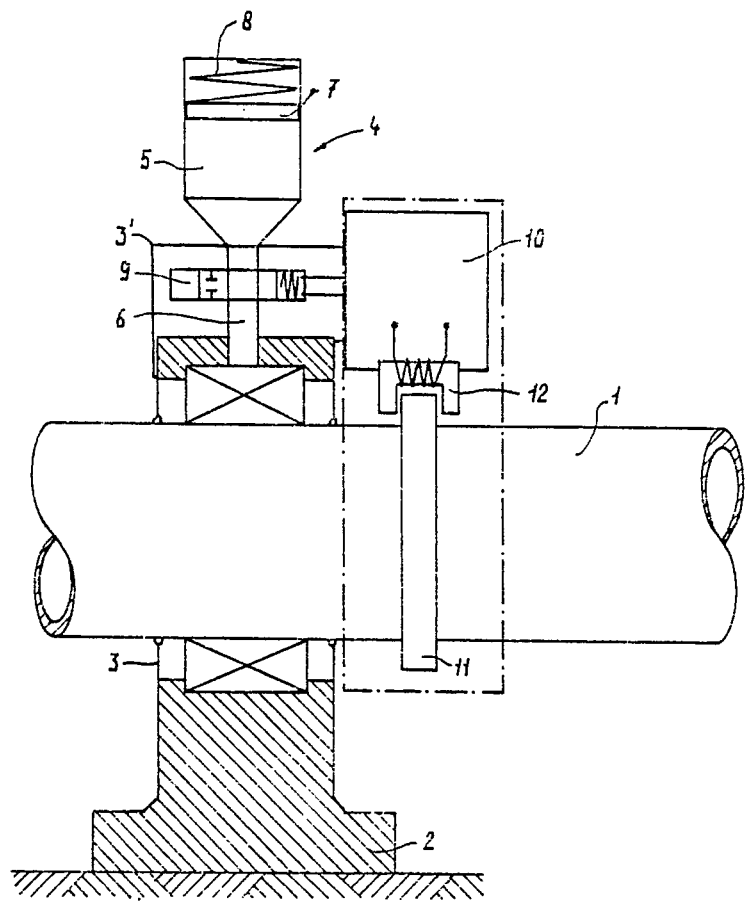

LUBRICATING DEVICE

This invention relates to a device for supplying a lubricant to a mechanism, in particular a rolling bearing.

The invention concerns a device for supplying a lubricant to a mechanism, in particular a rolling bearing, comprising a container for holding a quantity of lubricant, which is provided at its lower end with a discharge channel for the lubricant and wherein a spring-loaded piston-like element is located so that the spring force presses this element in the direction of the discharge channel, whereat the lubricant is placed between said element and the discharge channel. Such a device is disclosed in European Pat. No. 30911.

In this known device, after it is mounted on the housing of the rolling bearing to be lubricated, an essentially constant quantity of lubricant per unit of time is continuously forced through the discharge channel into the bearing, because the spring, tensioned in the starting position, gradually expands and thereby forces the piston-like element in the direction of the discharge channel. The disadvantage of this known device is that feeding of the lubricant cannot be controlled with it, so that often too much lubricant is supplied, which results in an increase of the temperature of the bearing in operation. In addition, in the known device, the supply of the lubricant cannot be halted when, for example, a tool driven by a shaft supported by the bearing is shut down.

The object of the invention is to procure a device of the type mentioned above which does not have these disadvantages. The object is accomplished in that in the device according to the invention, in the discharge channel is mounted a valve member, normally found in the closed position, which is coupled with control means for at intervals bringing the said valve member into the open and again into the closed position.

In a device designed in this way, the control means may be adjusted so that each time the valve member opens, the proper quantity of lubricant for the bearing concerned is supplied to this bearing. At the same time, by turning off the control means, feeding of the lubricant may be halted.

The control means preferably comprise an electric circuit, which upon excitation, actuates the valve member.

In a device that is mounted on a rolling bearing with a shaft carried therein, the electrical energy for energizing the circuit is advantageously generated by means with which the bearing-shaft assembly is provided, these means preferable being formed by a ring with magnets, mounted about the shaft, and a coil cooperating with this ring and attached to the housing of the bearing.

Thus, in this way, only when the shaft rotates, and thus, the rolling bearing supporting this shaft is in operation and the need for lubricant arises, will the electrical energy necessary for energizing the timing means be generated, such circuit actuating the valve member, so that at intervals the bearing is provided with lubricant. As soon as the shaft is halted, the supply of lubricant is likewise halted.

It is noted that U.S. Pat. No. 3,430,731 discloses a device for supplying a lubricant where the expulsion means are formed by a membrane capable of expansion and mounted in a container for the lubricant provided with a discharge channel, which membrane at one side limits a chamber within the container holding the lubricant and on the other side a chamber within the container holding an electrolyte, there being present a plurality of galvanic elements to be introduced into this latter chamber, so that by introducing one or more of these galvanic elements into the said chamber a gas is developed to a particular extent, causing the membrane to expand gradually in the direction of the discharge channel, whereby the lubricant is expelled from the container. Although with this device the quantity of lubricant supplied per unit of time may be regulated, by a selection of the number of galvanic elements introduced into the electrolyte, such a set quantity can never be reduced. Likewise, the device cannot be halted. In addition, the danger exists that gases harmful to the bearing to be lubricated may traverse the membrane.

The invention is described in detail with the aid of the DRAWING, wherein a device according to the invention is illustrated.

As shown in the drawing, a shaft 1 is carried in a rolling bearing 3 supported by a base 2. On the housing 3' of the rolling bearing is mounted a device 4 for supplying a lubricant to the bearing. This device 4 comprises a container 5 for holding a quantity of lubricant, which container is provided at the lower end with a discharge channel 6. Inside the container 5 is mounted, displaceable, a piston-like element 7 on which a tensioned spring 8 acts, so that the gradual expansion of this spring 8 drives the piston-like element 7 in the direction of the channel 6, and the lubricant for the channel 6 held in the container is at the same time pressed into the rolling bearing 3.

In the discharge channel 6 is mounted a valve member 9, which is normally found in the closed position. The valve member 9 is controlled by an electrical circuit 10, i.e. electrical timer, which is set in such a way that at intervals the valve 9 is brought into the open position for a given time, so that during this time a given quantity of lubricant is conveyed out of the container 5 to the bearing 3, after which this supply is discontinued.

The electrical energy for energizing the circuit 10 is generated by means of a ring 11 with magnets, mounted about the shaft 1, which cooperates with a coil 12 that is connected with the housing 3' of the bearing 3. Thus, only upon rotation of the shaft 1 will electrical energy for energizing the circuit 10 be generated, so that, likewise, only upon rotation of the shaft 1 can the valve 9 be brought into the open position.

What is claimed is:

1. Device for supplying a lubricant to a mechanism, in particular a rolling bearing, comprising a container for holding a quantity of lubricant under pressure, which container at its lower edge is provided with a discharge channel for the lubricant to lubricate said mechanism and wherein a spring-loaded piston-like element is located in said container in such a fashion that the force of the spring presses this element in the direction of the discharge channel, characterized in that in the discharge channel (6) is mounted a valve member (9), normally found in the closed position to cooperate with said piston-like element to form a pressurized container, which valve member (9) is coupled with an electrical circuit timing control means (10) which upon excitation controls the valve member using a timer at intervals bringing this valve member into the open and again into the closed position to thereby deliver a quantity of said lubricant from said pressurized container, said electrical circuit being energized solely by means (11, 12) on the bearing shaft assembly (3) for generating, upon rotation of the shaft (1), electrical energy for feeding the circuit (10), characterized in that about the shaft (1) is mounted a ring (11) having magnets, and the housing (3') of the bearing (3) is connected with a coil (12) cooperating with this ring to generate said electrical energy only during rotation of the shaft, whereby said device supplies lubricant to said mechanism during said intervals only when said shaft is rotating for sufficient time to generate electrical energy.

* * * * *